(12) United States Patent
Keely et al.

(10) Patent No.: US 7,167,165 B2
(45) Date of Patent: Jan. 23, 2007

(54) TEMPORARY LINES FOR WRITING

(75) Inventors: Leroy B Keely, Portola Valley, CA (US); Charlton Lui, Vancouver (CA); Marieke Iwema, Seattle, WA (US); Luis M Huapaya, Redmond, WA (US); Jeffrey W Pettiross, Seattle, WA (US); Erik M Geidl, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 642 days.

(21) Appl. No.: 10/284,471

(22) Filed: Oct. 31, 2002

(65) Prior Publication Data

US 2003/0214491 A1 Nov. 20, 2003

Related U.S. Application Data

(63) Continuation-in-part of application No. 10/146,487, filed on May 14, 2002.

(51) Int. Cl.
*G09G 5/00* (2006.01)

(52) U.S. Cl. .................. 345/179; 715/808; 715/863; 715/864; 715/510; 715/530

(58) Field of Classification Search .............. 345/179, 345/173; 715/768, 808–809, 856–859, 511–512
See application file for complete search history.

(56) References Cited

U.S. PATENT DOCUMENTS

| | | | | |
|---|---|---|---|---|
| 5,613,019 A | * | 3/1997 | Altman et al. | 382/311 |
| 5,633,957 A | * | 5/1997 | Robinson | 382/292 |
| 5,638,501 A | * | 6/1997 | Gough et al. | 345/639 |
| 5,666,139 A | * | 9/1997 | Thielens et al. | 345/173 |
| 5,798,752 A | * | 8/1998 | Buxton et al. | 715/863 |
| 5,864,636 A | * | 1/1999 | Chisaka | 382/189 |
| 5,867,150 A | * | 2/1999 | Bricklin et al. | 345/173 |
| 5,883,622 A | * | 3/1999 | Chan et al. | 345/173 |
| 5,893,126 A | * | 4/1999 | Drews et al. | 715/512 |
| 6,088,481 A | * | 7/2000 | Okamoto et al. | 382/189 |
| 6,124,861 A | * | 9/2000 | Lebovitz et al. | 715/808 |
| 6,396,502 B1 | * | 5/2002 | Cunniff | 345/582 |
| 6,396,598 B1 | * | 5/2002 | Kashiwagi et al. | 358/474 |
| 6,499,043 B1 | * | 12/2002 | Forcier | 715/541 |
| 6,571,012 B1 | * | 5/2003 | Pettigrew | 382/167 |
| 6,727,929 B1 | * | 4/2004 | Bates et al. | 715/862 |

(Continued)

*Primary Examiner*—Amr A. Awad
*Assistant Examiner*—Sameer Gokhale
(74) *Attorney, Agent, or Firm*—Banner & Witcoff, Ltd.

(57) ABSTRACT

A user is provided with guidelines that are temporarily displayed with content, in order to assist the user in neatly and accurately writing electronic ink. The guidelines may appear when the user moves a writing tool, such as a stylus or pen, close to a display and writing surface. Alternately, the guidelines may appear after the user has begun to write electronic ink, so that the guidelines can correspond to the angle at which the user is writing, the size of the user's handwriting, or both. As the user writes the electronic ink onto the writing surface, the handwritten electronic ink is added to the content being rendered on the display. After the user has finished writing electronic ink and moves the writing tool away from the writing surface, the guidelines are deleted, and are not added to the displayed content. In this way, the user can employ the temporary guidelines to accurately and legibly write electronic ink into content, without the guidelines themselves becoming a permanent part of the content.

16 Claims, 10 Drawing Sheets

U.S. PATENT DOCUMENTS

| | | | |
|---|---|---|---|
| 2002/0011990 A1* | 1/2002 | Anwar | 345/173 |
| 2002/0044152 A1* | 4/2002 | Abbott et al. | 345/629 |
| 2003/0001899 A1* | 1/2003 | Partanen et al. | 345/800 |
| 2003/0071850 A1* | 4/2003 | Geidl | 345/781 |
| 2003/0142112 A1* | 7/2003 | Saund et al. | 345/619 |
| 2003/0152268 A1* | 8/2003 | Seto et al. | 382/187 |
| 2005/0025363 A1* | 2/2005 | Lui et al. | 382/187 |

* cited by examiner

...m. It can take notes in electronic ink or text, send e-mail, play music and movies, run existing and new software, and link wirelessly to various networks, including the Web. It's capable of holding more than 50,000 books today and millions of books within a decade or so. It's a combination of an electronic book, an electronic magazine, your computer, a stereo, a television, a tablet of paper, and a pen -- all in one incredible device. Does that sound something people might want? I certainly think so.

Ultimately, I think the most likely device for reading eBook titles and electronic periodicals will be the Tablet PC we're working on. It's the size of an 8"-by-11" piece of paper, is less than an inch thick, and weighs less than a kilogram. It can take notes in electronic ink or text, send e-mail, play music and

TEMPORARY LINES FOR WRITING

RELATED APPLICATIONS

This application is a continuation-in-part application of U.S. patent application Ser. No. 10/146,487, entitled "Write Anywhere Tool," filed on May 14, 2002, and naming Luis M. Huapaya et al. as inventors, which application is hereby incorporated entirely herein by reference.

FIELD OF THE INVENTION

The present invention relates to a user interface that provides guidelines for handwriting electronic ink. More particularly, the present invention relates to a user interface that displays temporary guidelines in content, to help a user more accurately write electronic ink into or over that content.

BACKGROUND OF THE INVENTION

As computers become more and more integrated into our modem society, there is a growing need for tools that will allow a user to efficiently enter data into a computer. Some of the most desired input tools are those that allow a user to enter data using natural input techniques rather than typing on a physical or software QWERTY keyboard. These natural input techniques, which include handwriting, offer users the promise of a familiar and convenient method of creating data that requires no special skills.

To this end, great strides have been made in developing software applications that allow a user to input data by handwriting. These applications allow a user to employ a pen or stylus to write in electronic ink. More particularly, these applications register the location of the stylus as it moves across a writing surface. These locations are then grouped together into a stroke, which conceptually corresponds to a stroke formed with physical ink. The strokes can then be collected into larger groups to form letters, words, and lines. Electronic ink can be converted into text, such as, for example, ASCII text. The electronic ink also can be stored itself as content in an electronic file.

Some software applications have even been developed that allow a user to handwrite electronic ink directly into the existing content of an electronic file. For example, electronic book applications display content in the form of the text and drawings of a book. In addition to allowing a user to simply view text and images, some electronic book applications may allow a user to annotate portions of the content with electronic ink. For example, some electronic book applications may permit a user to handwrite annotations with electronic ink in the margins of the text. Still other electronic book applications may even allow a user to handwrite annotations with electronic ink over the text or drawings themselves. Thus, these applications offer a user the ability to add handwritten electronic ink to existing content.

Still other software applications provide a user with a transparent interface that allows the user to write electronic ink over displayed content. More particularly, these applications provide a transparent user interface that overlays some or all of the content rendered on a display. The user can then designate an insertion point somewhere in the displayed content, which may or may not be located in the content directly under the transparent interface. The user then writes the electronic ink into the transparent interface overlay, rather than into the content underlying the transparent interface. A recognition process recognizes text corresponding to the electronic ink, and inserts the recognized text into the displayed content at the insertion point. Thus, while it may appear that the user is writing the electronic ink into the underlying content, the user is actually writing the electronic ink onto the transparent interface "over" the underlying content. With some embodiments of these applications, text can be recognized from the electronic ink and inserted immediately, while other embodiments of these applications may postpone recognizing the electronic ink until the user has completed writing the electronic ink or specifically commands the application to recognize the written ink.

As may be appreciated, however, individual handwriting for electronic ink can vary widely. While some people can handwrite even cursive letters neatly and in a straight line, others may have difficulty writing legibly without some assistance. This difficulty can be compounded if the application is being implemented on an unfamiliar writing surface, such as a large, unwieldy digitizing display. Accordingly, there is a need for a handwriting input interface that will assist a user in legibly handwriting electronic ink into or over existing content.

SUMMARY OF THE INVENTION

Advantageously, the temporary lines created according to the invention provide the user with guidelines that are displayed with content, in order to assist the user in neatly and accurately writing electronic ink either into the content or over the content. The invention may be employed, for example, when the user is displaying content on a display that also accepts electronic ink from handwriting. The guidelines may appear when the user moves a writing tool, such as a stylus or pen, close to the electronic ink input area of a writing surface. Alternately, the guidelines may appear after the user has begun to write electronic ink, so that the guidelines can correspond to the angle at which the user is writing, the size of the user's handwriting, or both. After the user has finished writing electronic ink and moves the writing tool away from the writing surface or outside of the electronic ink input area, the guidelines are hidden, and are not added to the displayed content. In this way, the user can employ the temporary guidelines to accurately and legibly write electronic ink into or over content, without the guidelines themselves becoming a permanent part of the content.

BRIEF DESCRIPTION OF THE DRAWINGS

The foregoing summary of the invention, as well as the following detailed description of preferred embodiments, will be better understood when read in conjunction with the accompanying drawings.

DETAILED DESCRIPTION OF PREFERRED EMBODIMENTS

Overview

The present invention relates to a tool that provides temporary guidelines to assist a user in handwriting electronic ink into or over content. A temporary line tool according to the invention may be implemented with instructions that can be executed on a computing device. Accordingly, an exemplary computing environment for executing such instructions will be described. Various interfaces demonstrating the operation and use of the invention will also be described, along with the components and functions of a temporary line tool according to the invention.

Exemplary Operating Environment

As previously noted, the temporary line tool of the invention may be implemented using software. That is, the temporary line tool may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
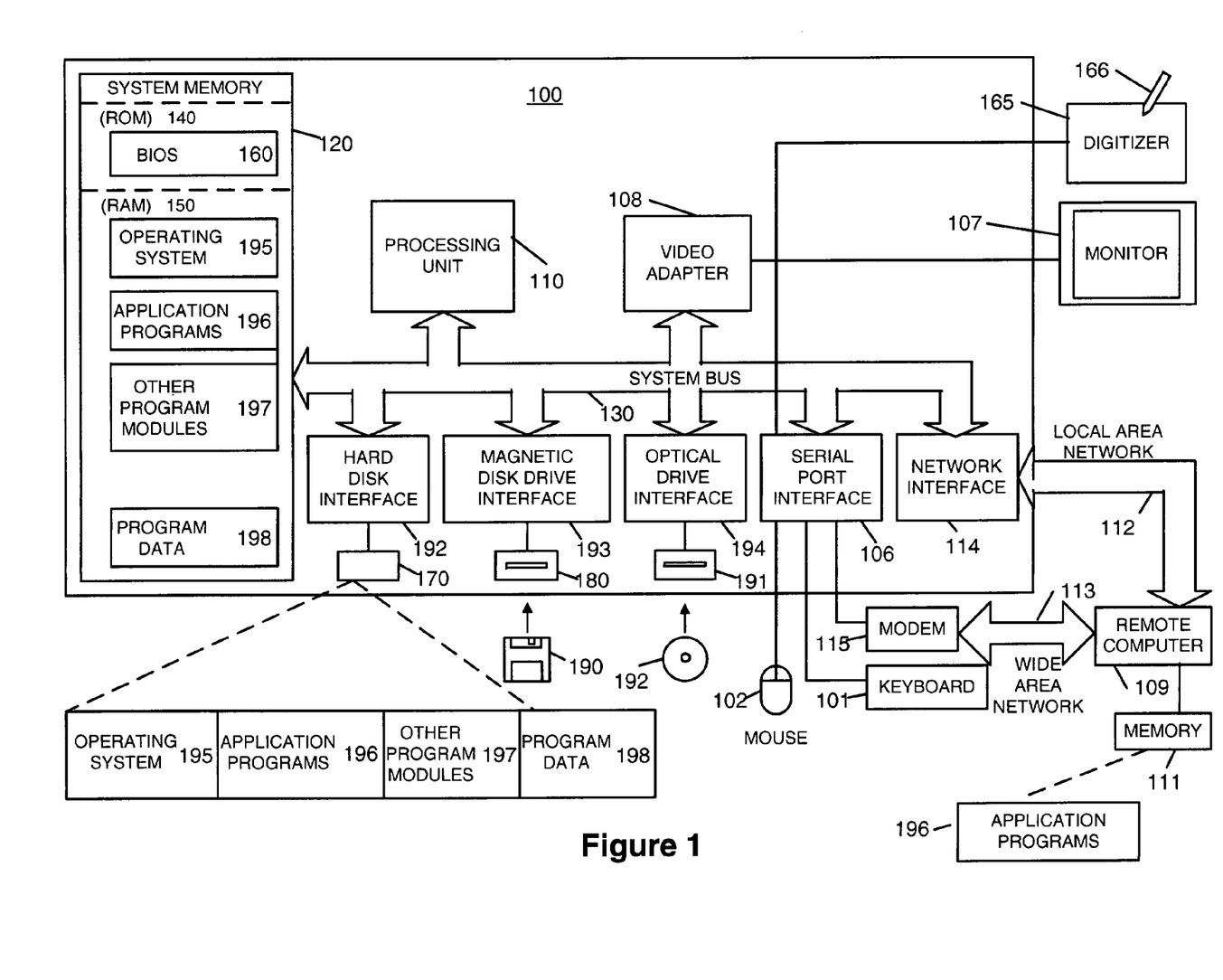
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, network server or the like.

Computer 100 typically includes at least some form of computer readable media. Computer readable media can be any available media that can be accessed by the computer 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk, a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102 (for example, a mouse, touchpad, or pointing stick). As previously noted, the invention is directed to a tool for guiding handwriting input. As will be appreciated by those of ordinary skill in the art, while handwriting input can be generated using a variety of pointing devices, the most convenient pointing device for creating handwriting input is a pen. Accordingly, the computing device 120 will typically include a digitizer 165 (sometimes referred to as a graphics pad) and a stylus or pen 166, which a user may employ to create handwriting input.

As will be appreciated by those of ordinary skill in the art, with some embodiments, the digitizer 165 receives handwriting input when the stylus or pen 166 contacts the surface of the digitizer 165. With other embodiments, the digitizer 165 may receive handwriting input from a light beam generated by the pen 166, by tracking the angular movement of a mechanical arm supporting the pen 166, or by another suitable technique. The computer 100 may also have additional input devices, such as a joystick, game pad, satellite dish, scanner, touch screen, or the like.

These and other input devices often are connected to the processing unit 110 through a serial port interface 106 that is coupled to the system bus 130, but may be connected by other interfaces, such as a parallel port, game port, IEEE-1394B bus, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As will be appreciated by those of ordinary skill in the art, the monitor 107 may incorporate the digitizer 165, to form a digitizing display 165. This arrangement conveniently allows a user to employ the pen 166 to point directly to objects displayed on the digitizing display by contacting the display screen of the display 165.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, and thus will not be explained in detail here.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, may be connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

The Temporary Line Tool

Figure 2:
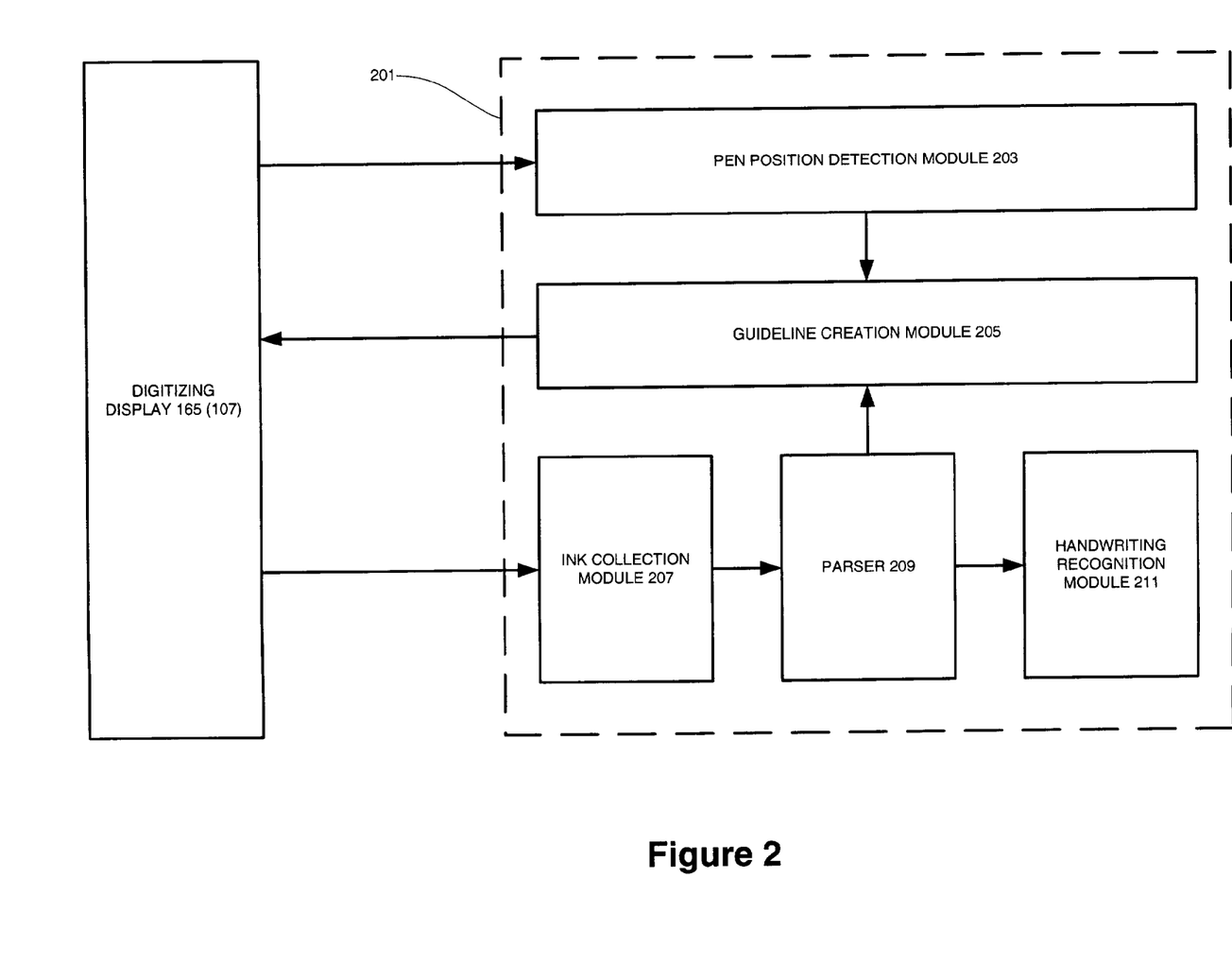
FIG. 2 illustrates a block diagram showing components of a tool for providing temporary handwriting guidelines according to one embodiment of the invention.

FIG. 2 illustrates a temporary line tool 201 for creating temporary guidelines. As seen in this figure, the temporary line tool 201 includes a pen position detection module 203 and a guideline creation module 205. The tool 201 also includes an ink collection module 207, a parser 209, and a handwriting recognition module 211. Each of these components will be discussed in detail below.

The pen position detection module 203 detects the position of a pen or stylus 166, relative to displayed content, that the user will employ to handwrite electronic ink into or over that content. For example, if the user is employing a stylus 166 with a digitizing display 165 as illustrated in FIG. 2, then the pen position detection module 203 will detect the position of the stylus 166 relative to the digitizing display 165 and thus the content rendered on the display 165. With some digitizing displays, the pen position detection module 203 will detect the position of the stylus 166 when it contacts the surface of the digitizing display 165. With other types of digitizing displays, however, such as the digitizing display 165 employed with the illustrated embodiment, the pen position detection module 203 can detect when the stylus 166 is simply hovering over the surface of the digitizing display 165.

When the pen position detection module 203 detects that the position of a stylus 166 is relatively close to the digitizing display 165, it passes this position information along to the guideline creation module 205. If the detected position of the stylus 166 is over the user interface for a software application that can accept electronic ink input produced with the stylus 166, then the guideline creation module 205 will create and render temporary guidelines on the display 165. Thus, the pen position detection module 203 and the guideline creation module 205 will determine when the stylus 166 moves toward and away from an area corresponding to content rendered on the display 165.

More particularly, as noted above, with some digitizing displays the pen position detection module 203 will detect when the stylus 166 is hovering above the display 165. With these embodiments, the pen position detection module 203 will report to the guideline creation module 205 when it detects a stylus 166 hovering just above the display 165, and the position of the stylus 166 relative to the surface of the display 165. Alternately, if the digitizing display 165 only allows the pen position detection module 203 to detect the position of a stylus 166 contacting the digitizing display 165, then when the user contacts the stylus 166 with the surface of the digitizing display 165, the pen position detection module 203 will register the position of contact and provide this information to the guideline creation module 205.

In response to receiving stylus position information from the pen position detection module 203, the guideline creation module 205 will determine if the position of the stylus 166 is over an electronic ink input area. That is, the guideline creation module will determine if the stylus 166 is over an area corresponding to a user interface that will accept electronic ink created with the stylus 166. For some embodiments of the invention, electronic ink created with the stylus 166 is added directly to content already displayed on the digitizing display 165. With these embodiments, the software application rendering the content will define boundaries, such as a "window," for accepting electronic ink data. If the stylus 166 is located above an area of the digitizing display 165 outside of those boundaries, then the guideline creation module 205 will determine that the position of the stylus 166 is not over an electronic ink input area.

For still other embodiments of the inventions electronic ink created with the stylus 166 is added to a transparent interface provided over underlying content rendered by one or more other software applications. With these embodiments, the transparent interface defines boundaries for accepting electronic ink input. Again, if the stylus 166 is located above an area of the digitizing display 165 outside of those boundaries, then the guideline creation module 205 will determine that the position of the stylus 166 is not over an electronic ink input area.

If the guideline creation module 205 determines that the stylus 166 is over an electronic ink input area, it will create guidelines for rendering on the display 165. More particularly, the guideline creation module 205 will create image data defining the characteristics of one or more guidelines, including its size, color, and the location at which it is to appear on the display 165. This image data will then be provided to the display 165, so that the guideline (or guidelines) may be rendered by the display 165. As will be discussed in detail below, the guidelines will be positioned at a location corresponding to the detected position of the stylus 166.

With some embodiments of the invention, the guideline creation module 205 will locate the guideline or guidelines directly below the position of the stylus 166, regardless of the content in that location that is already being rendered by the display 165. Thus, in some situations, the guideline or guidelines may appear superimposed over text or images that are already being rendered on the display 165. Such images may include, for example, ink, watermarks or existing rules or lines.

With alternate embodiments of the invention, however, the guideline creation module 205 will only place the guidelines over particular types of content. For example, some embodiments of the invention may only place guidelines over "white space" content (that is, content which does not include any text or images). With these embodiments, the guideline creation module 205 may, for example, determine the white space of a minimum total area nearest to the stylus position given by the pen position detection module 203, and create one or more guidelines over this white space. Alternately, the guideline creation module 205 may create one or more guidelines located at the nearest white space to the stylus position having a minimum width, a minimum height, or a combination of the two. The image data for the guidelines created by the guideline creation module 205 is then rendered on the display 165 over the located white space. The guidelines thus are not overlaid on top of the images, text or other electronic ink currently shown in the display 165. Of course, still other embodiments of the invention may only locate guidelines over any possible combination of content types, such as over text content, but not over images or existing electronic ink, over image content, but not over text content or existing electronic ink, or over existing electronic ink, but not over text content or image content.

With some embodiments of the invention, the guideline or guidelines may be rendered by the software application already rendering the content shown on the display 165. For example, if guidelines are created to assist a user in adding electronic ink directly into content being rendered by of a software application, then that application may render the guidelines as well. Alternately, the guideline or guidelines may be rendered by a separate or special-purpose software application. Also, with some embodiments of the invention, the appearance of the guidelines may be selected to visibly distinguish the guidelines from existing content being rendered on the display 165. For example, the color of the guidelines may be selected so as to be easily distinguished from existing text or images.

For some embodiments of the invention, the guideline creation module 205 may create image data for only a single guideline. With other embodiments of the invention, however, the guideline creation module 205 may create image data for two, three, or even more vertically-stacked guidelines. Also, the guidelines may extend the entire length of the electronic ink input area. Alternately, the guidelines may only extend for a limited distance, or for a distance based upon the location of the guidelines. For example, the guidelines may have a fixed length of 2, 3, or 4 inches, or any other desired length. On the other hand, if the guidelines are only being rendered over a particular type of content, such as white space content, then the guidelines may be only as long or as high as the amount of content over which they can be rendered. For example, if the guidelines are to only be rendered in white space, they may have a height and length sufficient to fill the entire white space content over which they are displayed.

Once the guideline or guidelines are rendered on the display 165, it will continue to be displayed until the pen position detection module 203 detects that the stylus 166 has moved a threshold distance beyond its original position. This will maintain the guideline or guidelines in a fixed position while the user handwrites electronic ink. If the stylus 166 moves too far from its original position, however, then the guideline creation module 205 will discontinue displaying the guideline or guidelines.

More particularly, if the user moves the stylus 166 too far away (such as beyond a predetermined removal distance) from the surface of the digitizing display 165, then the pen position detection module 203 detects the removal of the stylus 166. In response, the guideline creation module 205 will send instructions to the display 205 to discontinue displaying the existing guideline or guidelines. Similarly, if the stylus moves to a new position outside of the electronic ink input area, the pen position detection module 203 will detect the new position of the stylus 166, and the guideline creation module 205 will send instructions to the display 205 to discontinue displaying the existing guideline or guidelines. The instructions to discontinue displaying the existing guideline or guidelines may be instructions to "hide" the guideline or guidelines, or they may instructions to delete the guideline or guidelines. If a guideline is hidden, then the guideline will be redisplayed at its original location if the stylus 166 moves back to its original location (or sufficiently close to its original location). If a guideline is deleted, however, then a new guideline will be created (which may have a different size, position or orientation) if the stylus 166 returns to its original location.

The user's handwriting may likewise lead the user to move the stylus 166 beyond its original position by the threshold distance, but to a location still within the electronic ink input area. The pen position detection module 203 will detect the new position of the stylus 166, and, in response, the guideline creation module 205 will create guidelines corresponding to the new position of the stylus 166. With some embodiments of the invention, the guideline creation module 203 may instruct the display 165 to hide or delete the previous guideline or guidelines, and create image data for a new guideline or guidelines. Alternately, the guideline creation module 203 may simply provide new image data that will extend the existing guideline or guidelines to reach the new position of the stylus 166. The guidelines may be extended toward the new position of the stylus 166 by adding additional guidelines, by increasing the length of the existing guidelines, or both, depending upon the new position of the stylus 166 relative to the orientation of the existing guidelines.

It should be noted that, in addition to the threshold and removal distances, the guideline creation module 207 can also extend, hide or delete the guideline or guidelines based upon the amount of time that the stylus 166 stays beyond the threshold or removal distance. For example, if the user moves the stylus 166 beyond the threshold distance for only a short period of time (for example, less than a threshold time of 1 second), then the guideline creation module 207 may not extend the guideline or guidelines to the new stylus position. Instead, the guideline creation module 207 may continue to display the guideline or guidelines until the stylus 166 returns to within the removal distance. Alternately, the creation module 207 may hide the guideline or guidelines. If, however, the user moves the stylus 166 beyond the threshold distance for a longer than the threshold period of time, then the guideline creation module 207 may extend the guideline or guidelines to the new stylus position or delete the original guideline or guidelines.

Similarly, if the user moves the stylus 166 beyond the removal distance from the display 165 for a short period of time, then the guideline creation module 207 may continue to display the guideline or guidelines until the time period expires or the stylus 166 is returned to within the removal distance. Alternately, the guideline creation module 207 may hide the guideline or guidelines. If, however, the stylus 166 moves beyond the removal distance from the display 165 for more than a threshold time, then the guideline creation module 207 may delete the guideline or guidelines.

It should also be noted that the threshold distance, the threshold time or both may vary depending upon the direction in which the stylus 166 is moved relative to the orientation of the guidelines. For example, the threshold distance may be smaller in the direction perpendicular to the guidelines than in the direction parallel to the guidelines, to allow the user to write large letters without extending the guidelines. Also, the threshold time for moving the stylus outside of the removal distance may be different than the threshold time for moving the stylus beyond the threshold distance.

Once the guideline or guidelines have been rendered on the display 165, the user may employ the guideline or guidelines to guide his or her handwriting with the stylus 166. That is, the user may adjust his or her handwriting so that the user's handwriting is within the area defined by the guideline or guidelines. As a user writes with the stylus 166, the ink collection module 207 tracks the movement of the stylus 166 to produce corresponding electronic ink.

With some embodiments of the invention, the electronic ink is inserted directly into the content at the location of the guidelines. That is, the electronic ink is added to the content in the same location at which it is written. Additionally, with some embodiments of the invention, the electronic ink may be rendered by the same software application displaying the content. For example, if user writes the electronic ink into the content of a Microsoft Word file being displayed by the Microsoft Word user interface, then the electronic ink collected by the ink collection module 207 will be added directly into the content of that Word file. Moreover, the Microsoft Word user interface may render the electronic ink. Thus, with these embodiments, the user can employ the guidelines to write electronic ink directly into displayed content. The electronic ink can be added to the displayed content in its original form. Alternately, the electronic ink can be converted into text data by a recognition process and then added directly into the content as text.

In other embodiments of the invention, however, the electronic ink created with the stylus 166 is received and displayed in a transparent user interface. With these embodiments employing a transparent user interface, the user can select an insertion point in content being rendered by a separate user interface. This displayed content may or may not underlie the transparent user interface. As the user writes the electronic ink with the stylus 166, the ink is displayed by the transparent user interface and recognized as text. The recognized text is then inserted into the content of the other user interface at the designated insertion point. Thus, for these embodiments, the electronic ink may be written over displayed content, rather than into displayed content as described immediately above.

Figure 3:
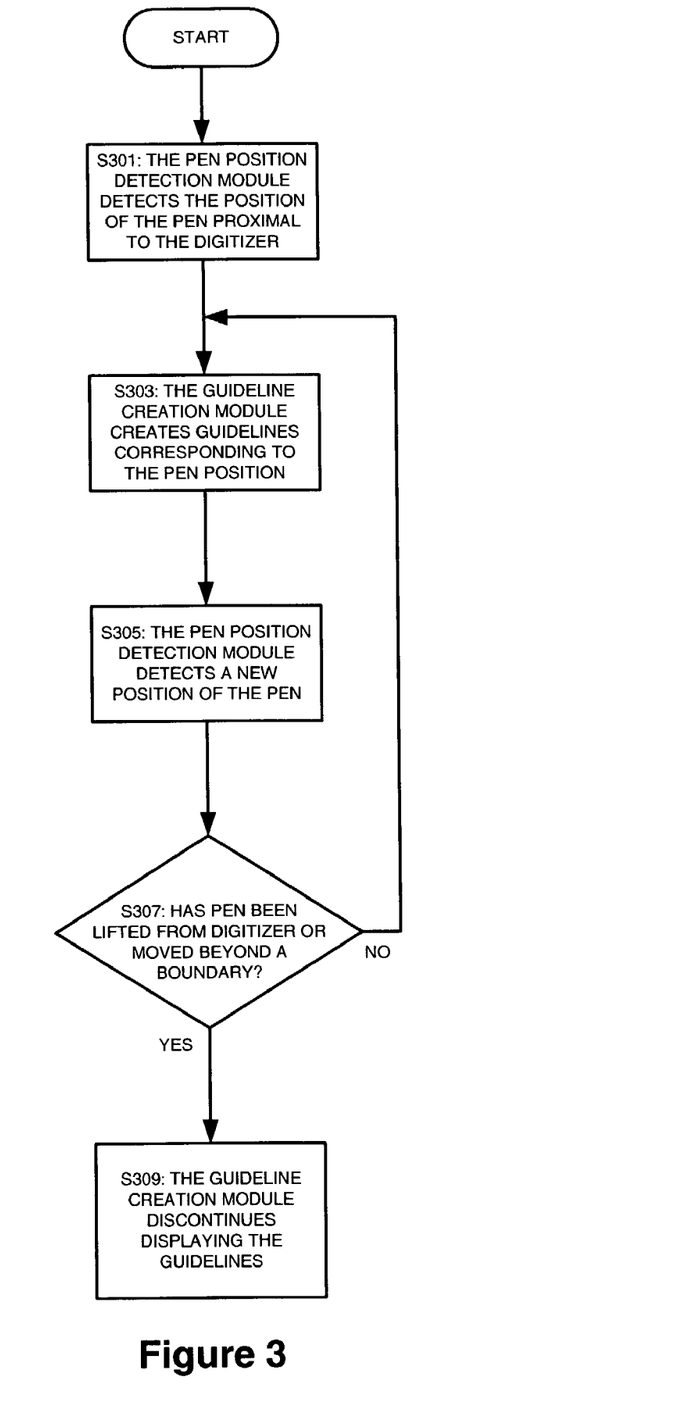
FIG. 3 illustrates a flowchart for providing temporary handwriting guidelines according to an embodiment of the invention.
Figure 4A:
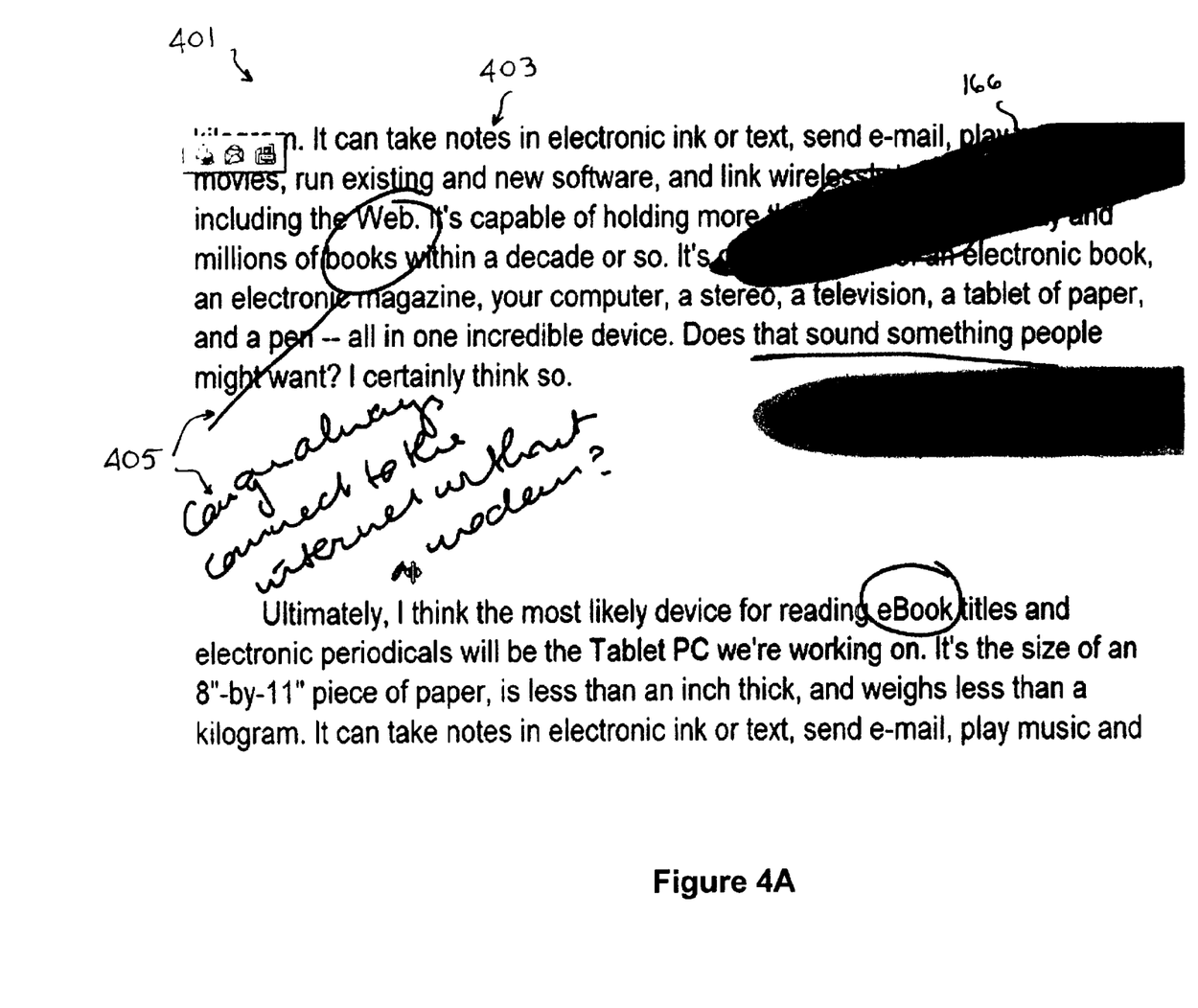
FIGS. 4A–4C illustrate user interfaces demonstrating the appearance and disappearance of temporary handwriting guidelines according to an embodiment of the invention.
Figure 4B:
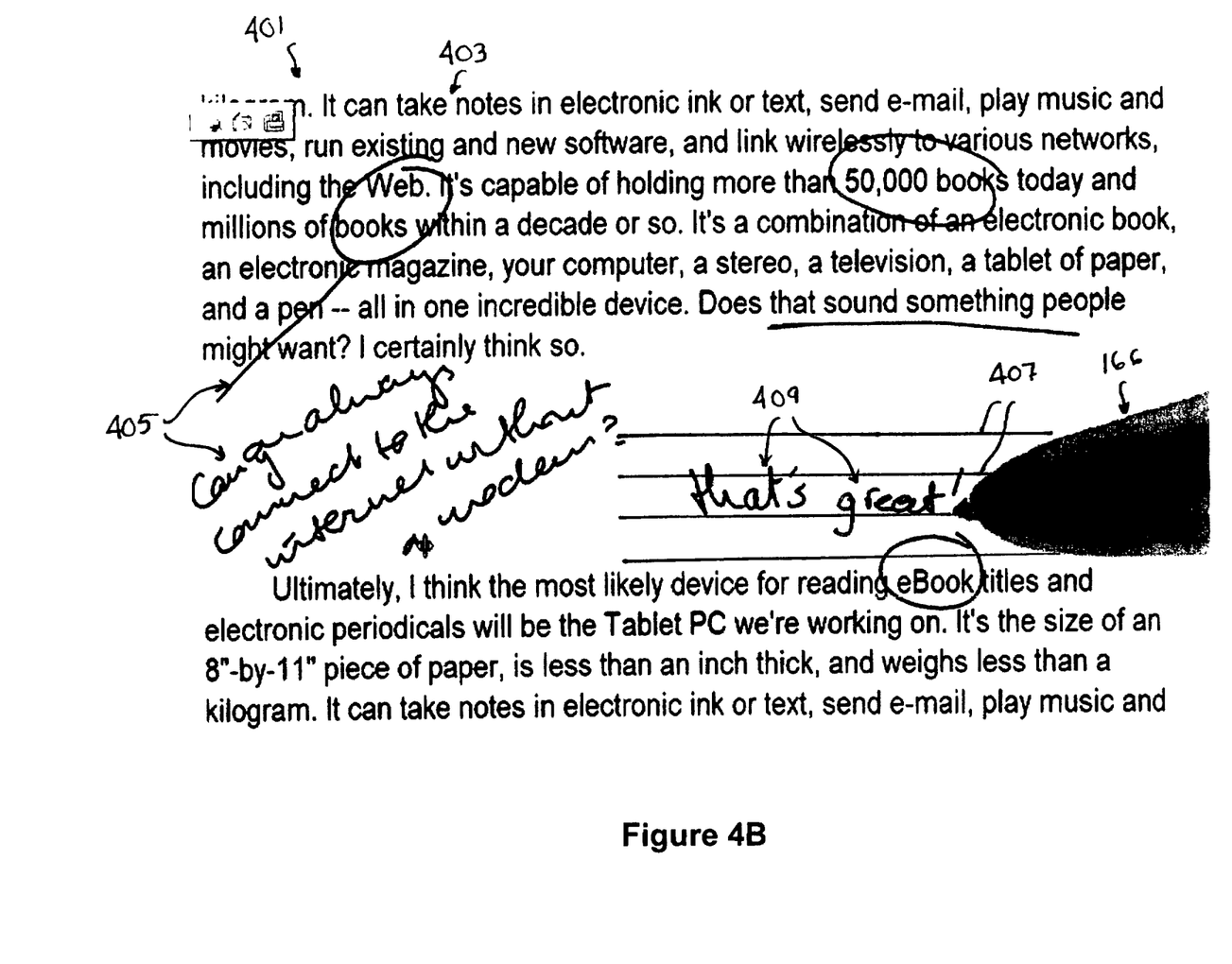

The operation of one embodiment of the invention will now be described with reference to the flowchart illustrated in FIG. 3 and to the user interfaces shown in FIGS. 4A–4C. As shown in FIG. 4A, the display 165 initially displays content 401. This content may include, for example, both typed text 403 and electronic ink 405. In this illustrated embodiment, the user has not yet moved the stylus 166 sufficiently close to the digitizing display 165 for the pen position detection module 203 to detect the position of the stylus 166. When the user does move the stylus 166 sufficiently close to the digitizing display 165, in step S301 the pen position detection module 203 detects the position of the stylus 166 proximal to the digitizing display 165.

Next, in step S303, the guideline creation module 205 receives the position of the stylus 166 from the pen position detection module 203. If the stylus 166 is over an electronic ink input area, the guideline creation module 205 creates guidelines 407 corresponding to the detected position of the stylus 166 in step S303. That is, the guideline creation module 205 creates the image data for rendering guidelines on the display 165. In response, the display 165 displays guidelines 407 on the display 165. As illustrated in FIG. 4B, the guidelines 407 are rendered within the content 401 already rendered on the display 165. Also, the guidelines 407 are of only limited length, and do not extend over the entire electronic ink input area.

Using these guidelines 407, a user can then employ the stylus 166 to handwrite words in electronic ink 409. This electronic ink 409 can then be collected by the ink collection module 207, and added to the content already rendered on the display 165. If the user writes the electronic ink 409 so that the position of the stylus 166 moves a threshold distance beyond its original location, then the pen position detection module 203 will determine a new position for the stylus 166 in step 305. In step S307, the pen detection module 203 and the guideline creation module 205 determine whether the user has lifted the stylus 166 beyond a threshold distance from the digitizer 165, and whether the new position of the stylus 166 is still above the electronic ink input area. If the user has not lifted the stylus 166 a threshold distance away from the surface of the digitizer 165 and the new position of the stylus 166 is above the electronic ink input area, then the guideline creation module 205 creates new guidelines 407 corresponding to the new stylus position. As previously noted, the new guidelines 407 may replace the previously existing guidelines 407, or they may simple extend the previously existing guidelines 407 toward the new position of the stylus 166.

Figure 4C:
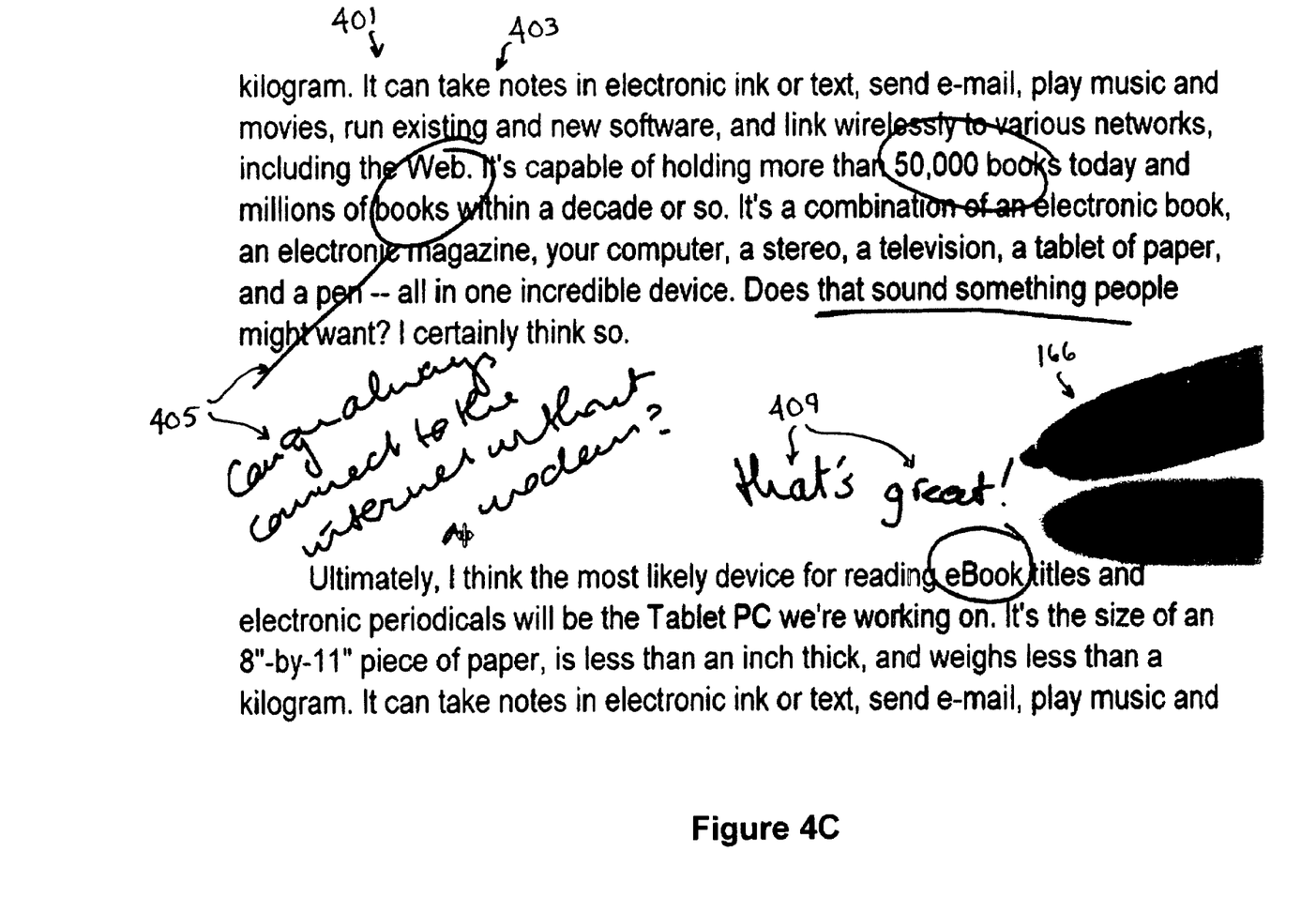

If, on the other hand, the user has completed writing the desired electronic ink 409 using the guidelines 407, the user will lift the stylus 166 at least the removal distance away from the display 165 as illustrated in FIG. 4C. Alternately, the user may move the stylus 166 outside of the electronic ink input area. If either occurs, the guideline creation module 205 will instruct the display 165 to discontinue displaying the guidelines 407 in step S309, as illustrated in FIG. 4C.

In the above-illustrated embodiment, the guidelines have a fixed direction and spacing. With alternate embodiments of the invention, however, both of the direction and spacing of the guidelines may be modified to adapt to the user's handwriting. Returning now to FIG. 2, the electronic ink written by the user will be collected by the ink collection module 207 and submitted to the parser 209 for parsing. As will be appreciated by those of ordinary skill in the art, the parser 209 uses a variety of heuristics to group electronic ink strokes into words, lines, and larger collections. The parser 209 may, for example, group electronic ink strokes based upon the sequence and timing in which they were created, their proximity, or other criteria known in the art. As a function of grouping electronic ink strokes, the parser 209 may also determine an angle at which words in the electronic ink have been written. With various embodiments of the invention, this angle information may be employed by the guideline creation module 205 to create the guidelines.

Figure 5:
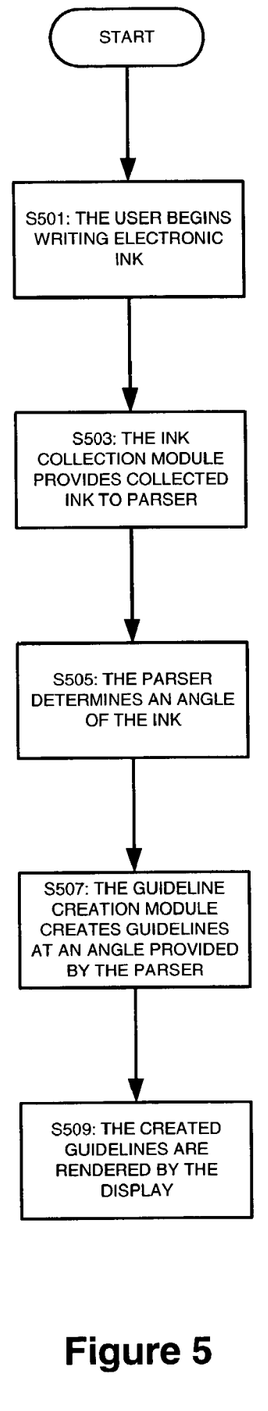
FIG. 5 illustrates a flowchart for providing temporary handwriting guidelines according to another embodiment of the invention.
Figure 7A:
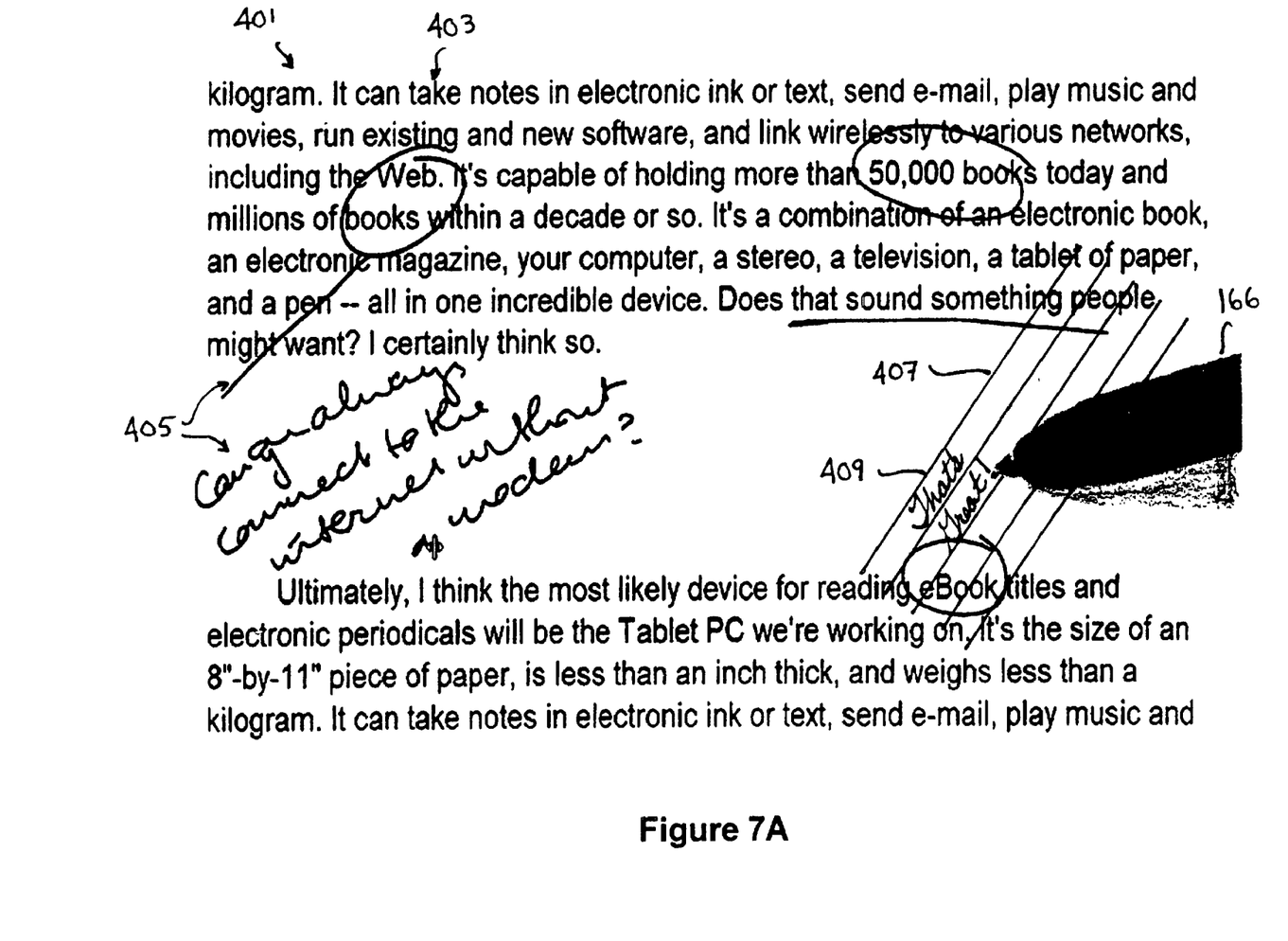
FIGS. 7A and 7B illustrate user interfaces demonstrating the display and deletion of temporary handwriting guidelines according to still other embodiments of the invention.

For example, referring now to the flowchart shown in FIG. 5 and the user interface illustrated in FIG. 7A, in step S501 the user begins writing electronic ink. The electronic ink is then collected by the ink collection module 207, and is provided to the parser 209 in step S503. Next, in step S505, the parser determines an angle at which the electronic ink has been written. Then, in step S507, the guideline creation module 205 creates guidelines at an angle provided by the parser 209, and in step S509 are rendered by the display 165 as illustrated in FIG. 7A. With some embodiments of the invention, the guideline creation module 203 may initially create horizontal guidelines, and then correct the angle of the guidelines as the user begins to write the electronic ink at an angle. Alternately, the guideline creation module 205 may postpone creating guidelines until after the user has written a sufficient amount of electronic ink for the parser 209 to provide angle information to the guideline creation module 205.

With some embodiments of the invention, the angle of the guidelines may even change as the direction of the user's handwriting changes. For example, with various embodiments of the invention, if the direction of the user's handwriting changes beyond a threshold value from its initial direction (such as by, e.g., 10°, then the direction of the guideline will also be changed to match the direction of the user's handwriting.

The guideline creation module 205 may additionally or alternately modify the spacing between multiple guidelines based upon the user's handwriting, as previously noted. For example, referring back to FIG. 2, the electronic ink written by a user may be submitted to the handwriting recognition module 211. As known to those of ordinary skill in the art, the handwriting recognition module 211 employs a variety of algorithms to recognize individual letters and words from handwritten electronic ink. During this process, the handwriting recognition module 211 may determine an average letter height of letters written in the electronic ink. Using this letter height information, the guideline creation module 203 may then modify the distance between guidelines to correspond with the user's handwriting.

Figure 6:
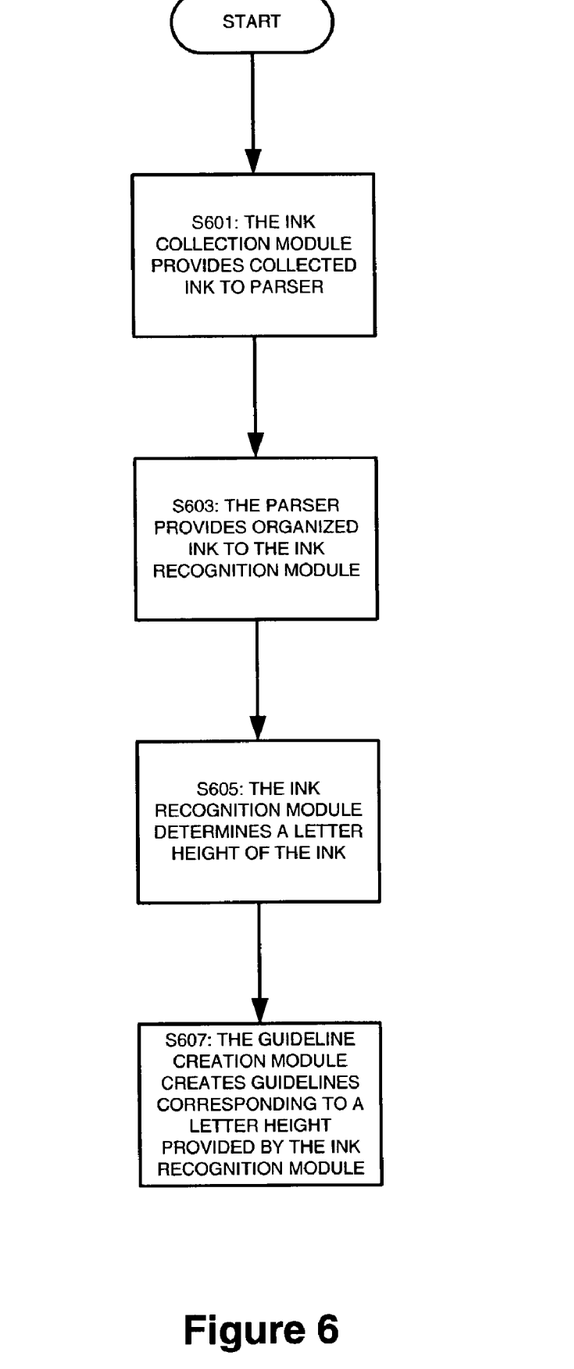
FIG. 6 illustrates a flowchart for providing temporary handwriting guidelines according to yet another embodiment of the invention.
Figure 7B:
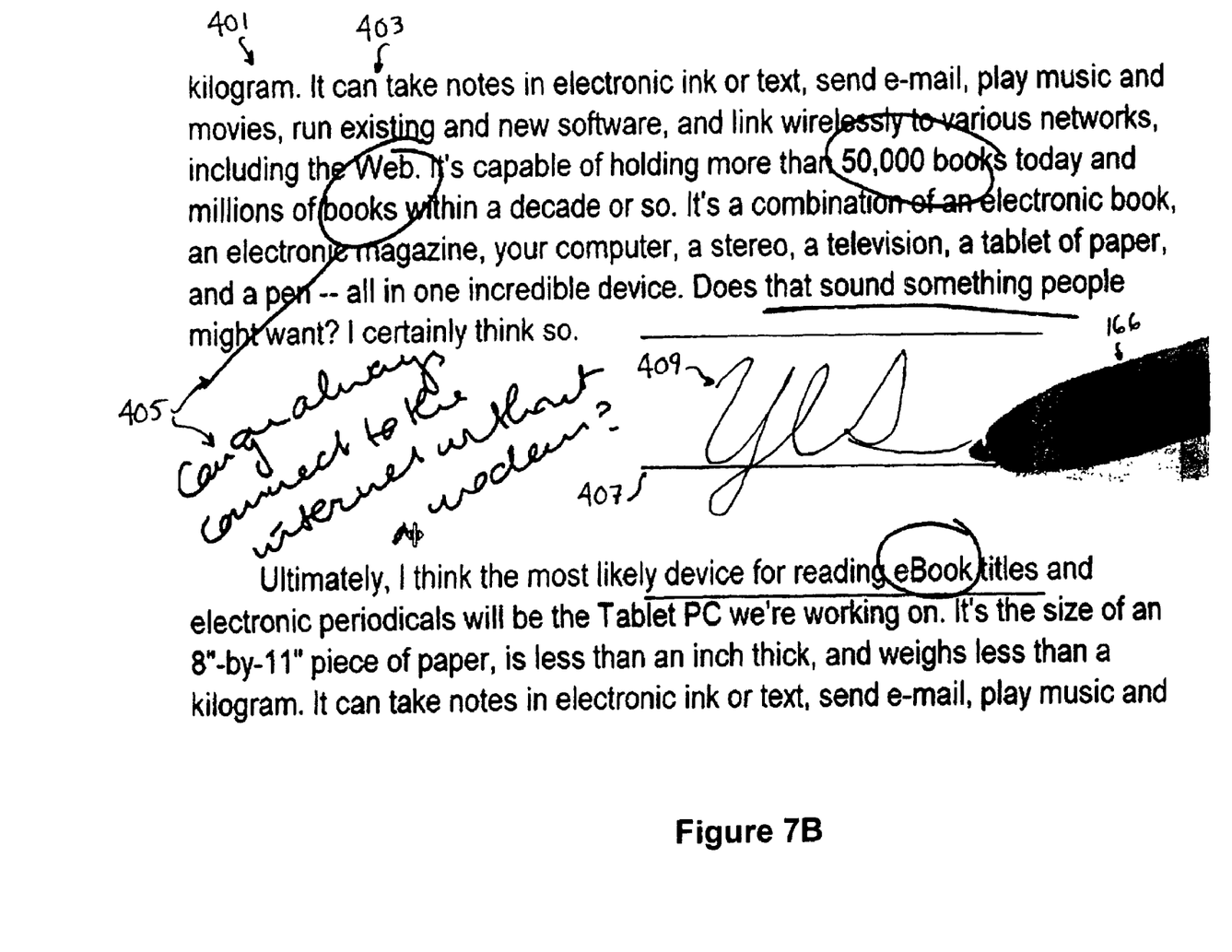

This process will be described in more detail, referring now to the flowchart illustrated in FIG. 6 and the user interface illustrated in FIG. 7B. First, in step S601, the ink collection module 207 provides the collected ink to the parser 209. Next, in step S603, the parser provides organized ink strokes to the ink recognition module 211. In step S605, the recognition module 211 determines the letter height of the letters recognized from the electronic ink, and provides this information to the guideline creation module 205. Then in step S607, the guideline creation module 205 creates guidelines having a spacing distance corresponding to the letter height provided by the ink recognition module 211, as shown in FIG. 7B. As with the previously described embodiment, the guideline creation module 205 may initially create guidelines having a default distance between them, and subsequently adjust the distance between the guidelines after receiving the letter height information from the ink recognition module 211. Alternately, the guideline creation module 205 may postpone creating the guidelines until the user has written enough electronic ink for the ink recognition module 211 to establish the letter height information.

CONCLUSION

Accordingly, the temporary guideline tool of the invention provides temporary guidelines to assist a user in neatly and accurately writing electronic ink. Moreover, the guidelines appear within displayed content, thereby assisting the user in properly writing electronic ink into or over the content. The guidelines are then removed when the user has finished writing the electronic ink.

The invention may include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. For example, various embodiments of the invention that are used with East Asian languages, such as Japanese konji, may employ guidelines formed by boxes rather than straight lines. It is intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A method of providing guidelines for handwriting, comprising:
    displaying content;
    detecting a position of a stylus proximal to the displayed content in an area that does not have guidelines for handwriting;
    in response to detecting the position of the stylus proximal to the displayed content in an area that does not have guidelines for handwriting, displaying at least one guideline in the content at a location corresponding to the detected position of the stylus; and
    collecting electronic ink produced by movement of the stylus; and
    adding the collected electronic ink to the content at the location corresponding to the detected position of the stylus;
    detecting movement of the stylus outside of an electronic ink input area corresponding to the displayed content for longer than a threshold amount of time, wherein the threshold time varies depending upon a direction of movement of the stylus; and
    deleting the at least one guideline in response to detecting movement of the stylus outside of the electronic ink input area corresponding to the displayed content for longer than a threshold amount of time.

2. The method of providing guidelines recited in claim 1, wherein the at least one guideline is displayed only in a white space content that does not contain a text or an image.

3. The method of providing guidelines recited in claim 2, wherein the at least one guideline is only rendered over one or more particular types of content closest to the detected position of the stylus.

4. The method of providing guidelines recited in claim 3, wherein the at least one guideline is displayed only over one or more particular types of content having a minimum area, a minimum height, a minimum length, or a combination of minimum height and minimum length.

5. The method of providing guidelines recited in claim 3, wherein the one or more particular types of content is white space content.

6. The method of providing guidelines recited in claim 1, further comprising:
   detecting movement of the stylus beyond a removal distance from an area corresponding to the displayed content; and
   deleting the at least one guideline in response to detecting movement of the stylus beyond a removal distance from the area corresponding to the displayed content.

7. The method of providing guidelines recited in claim 1, further comprising:
   detecting movement of the stylus beyond a removal distance from an area corresponding to the displayed content for longer than a threshold amount of time; and
   deleting the at least one guideline in response to detecting movement of the stylus beyond a removal distance from the area corresponding to the displayed content for longer than a threshold amount of time.

8. The method of providing guidelines recited in claim 1, further comprising:
   displaying the at least one guideline in response to detecting the stylus at a position above an electronic ink input area on a writing surface.

9. The method of providing guidelines recited in claim 1, further comprising:
   displaying the at least one guideline in response to detecting the stylus at a position contacting a writing surface within an electronic ink input area.

10. The method of providing guidelines recited in claim 1, further comprising:
    determining an angle at which the electronic ink is written; and
    displaying the at least one guideline at an angle corresponding to the angle at which the electronic ink is written.

11. The method of providing guidelines recited in claim 10, further comprising:
    determining a height of letters written in the electronic ink; and
    displaying a plurality of guidelines such that a distance between the guidelines corresponds to the height of the letters written in the electronic ink.

12. The method of providing guidelines recited in claim 1, further comprising:
    determining a height of letters written in the electronic ink; and
    displaying a plurality of guidelines such that a distance between the guidelines corresponds to the height of the letters written in the electronic ink.

13. The method of providing guidelines recited in claim 1, wherein the at least one guideline has a fixed length.

14. The method of providing guidelines recited in claim 13, wherein the fixed length of the at least one guideline is shorter than a length of an electronic ink input area.

15. The method of providing guidelines recited in claim 1, wherein
    the at least one guideline is only rendered over one or more particular types of content; and
    a size of the at least one guideline corresponds to a size of the one or more particular types of content over which the at least one guideline is rendered.

16. The method of providing guidelines recited in claim 15, wherein the one or more particular types of content is white space content.

* * * * *